June 6, 1933.  J. W. LITTLE  1,913,167
TITLE HOLDER FOR CAMERAS
Filed March 25, 1930   2 Sheets-Sheet 1
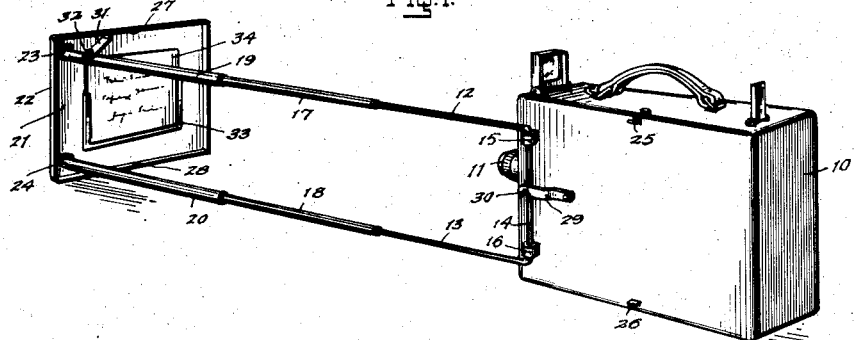
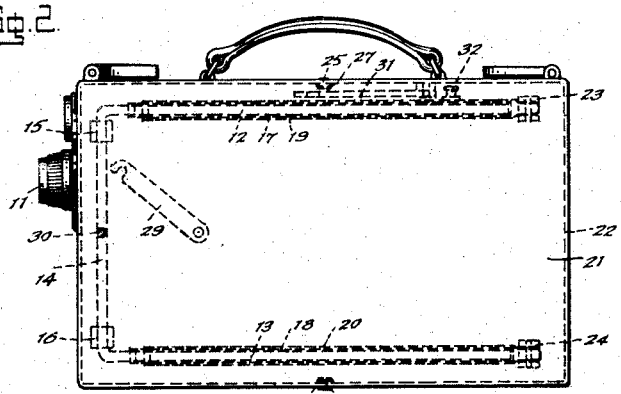
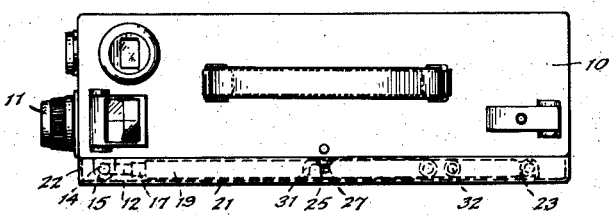
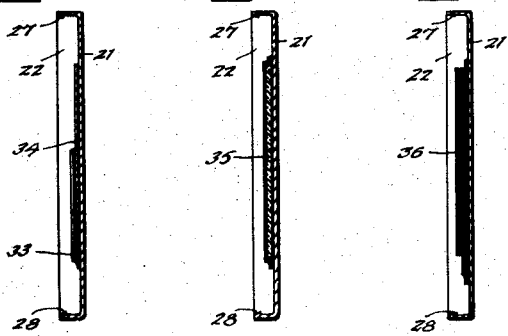
INVENTOR.
JOHN W. LITTLE.
BY
ATTORNEY

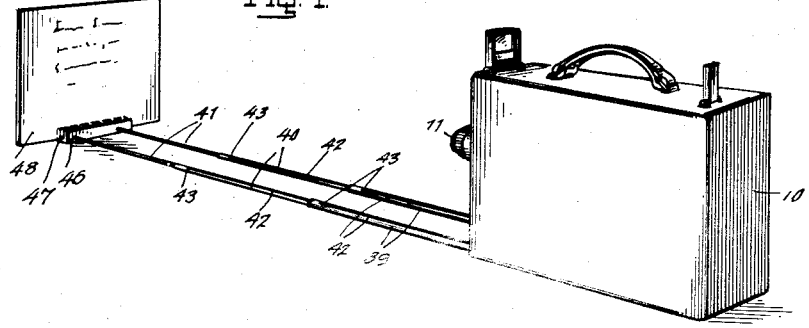
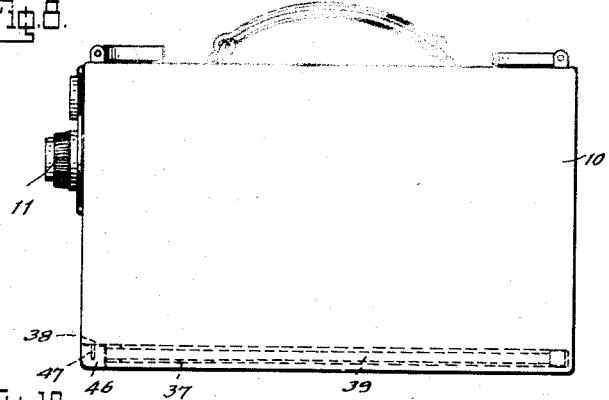
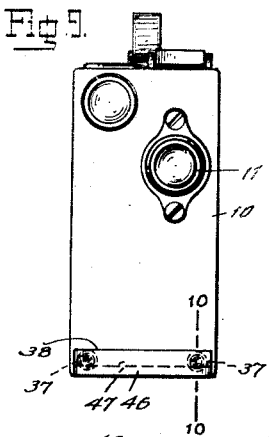
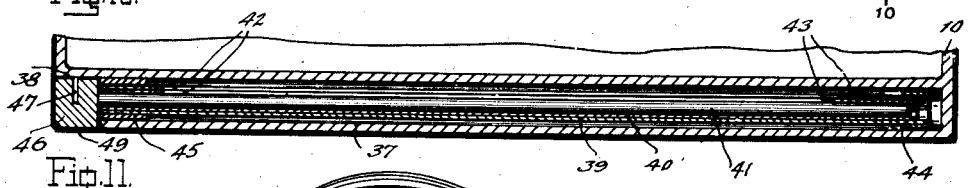
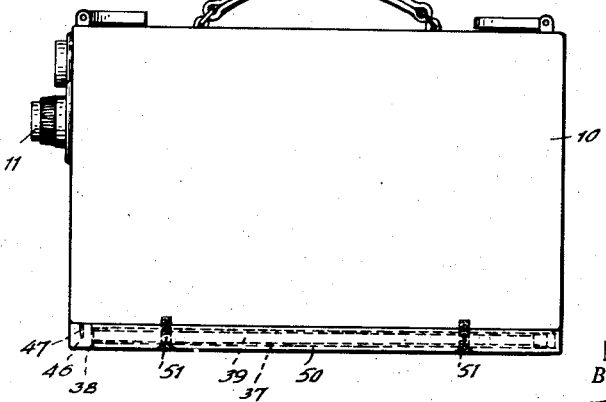

Patented June 6, 1933

1,913,167

UNITED STATES PATENT OFFICE

JOHN W. LITTLE, OF PAWTUCKET, RHODE ISLAND

TITLE HOLDER FOR CAMERAS

Application filed March 25, 1930. Serial No. 438,718.

The present invention relates to an improved title holder for cameras, and particularly motion picture cameras for amateur use, an object being to provide a device by means of which the proper title may be conveniently made at the time of taking the picture, thus providing an accurate title, directly associated with the particular picture, and doing away with the necessity for cutting and splicing-in the titles, as has been the custom heretofore.

A further object is to provide a title holder forming a permanent part of the cameras, which will be compact and neat in appearance, will be readily available at all times, and will accurately position the title for proper focus and range, depending upon the lens used.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a perspective view of one embodiment of the invention, showing the title holder in operative or open position.

Fig. 2 is a side elevation of the camera, showing the title holder in its inoperative or closed position.

Fig. 3 is a top plan view of the camera, also showing the title holder in its inoperative position.

Figs. 4, 5 and 6 are sectional views of the title holder panel, and showing modified forms of title receiving means.

Fig. 7 is a perspective view of a modified form of the invention, and showing the same in operative or extended position.

Fig. 8 is a side elevation of the same, showing the title holder in its inoperative or closed position.

Fig. 9 is a front elevation with the title holder in inoperative or closed position.

Fig. 10 is an enlarged longitudinal sectional view taken along the line 10—10 of Fig. 9.

Fig. 11 is a side elevation of a further modification.

Similar reference characters indicate corresponding parts throughout the several figures of the drawings.

Referring to the drawings, the motion picture camera 10 is of a conventional type, the lens being indicated at 11. The title holder, according to one embodiment of the invention, is mounted at one side of the camera, preferably the left hand side opposed to the crank or operating side.

A telescoping frame support is hingedly mounted on the side of the camera, near the forward edge, and comprises a bent rod having upper and lower horizontal portions 12 and 13 and a vertical portion 14 hingedly mounted in bearing supports 15 and 16 secured to the camera, tube extensions 17 and 18 being slidably mounted on the portions 12 and 13, and tube extensions 19 and 20 being slidably mounted on the tubes 17 and 18.

A title holder panel 21, flanged at its edges as at 22, is hingedly connected near one end to the tube extensions 19 and 20 by means of hinge brackets 23 and 24 secured upon the inner side of the panel, the panel corresponding in size to the side of the camera, and adapted in its inoperative or closed position to engage upon the same, as clearly indicated in Figs. 2 and 3. In the closed position the tubular extensions 17, 18 and 19, 20 telescope upon the rods 12 and 13 and lie flat upon the side of the camera within the enclosure formed by the flanged title holder panel 21, the latter being retained in closed position by means of depressible spring retainers 25 and 26 provided near the upper and lower edges of the camera side and adapted to engage behind lugs 27 and 28 formed upon the upper and lower flange portions of the panel.

In the operative position the telescoping frame support is extended and swung forwardly as shown in Fig. 1, the extension being predetermined to obtain the proper focus for the particular lens being used. The title holder panel is swung into position in front of the camera, with its inner side facing the lens.

In order to fix the position of the telescoping support relatively to the camera, a hook lever 29 is pivotally mounted on the side of the camera and is hooked with a pin 30 provided on the vertical rod 14. The title holder panel is also adapted to be fixed in relation to the telescoping support, and for this purpose a book lever 31 is pivotally mounted upon the upper flange portion and is hooked with a pin 32 provided on the tube extension 19. When thus positioned the title holder panel occupies a predetermined position in front of the lens so that no focusing is necessary.

The title holder is adapted to display the inscribed title at its inner side, and for this purpose may be provided, as shown in Figs. 1 and 4, with a frame 33 in which a card 34 bearing the inscribed title is inserted. As shown in Fig. 5 it may have a plate 35 of slate, or other suitable material, secured thereon, and on which the title may be inscribed and then erased, after being taken by the camera. As shown in Fig. 6 a pad of paper 36 may be mounted on the panel and as each sheet is inscribed it may be torn off to expose the next.

In Figs. 7 to 10 I have shown a modified form of the invention in which the title holder is housed and supported in the lower portion of the camera. For this purpose a pair of longitudinal passages or slideways 37—37 are provided adjacent the bottom of the camera and close to the vertical sides, these passages being closed at their rearward ends and opening at their forward ends into a transverse recess 38 provided in the lower forward corner of the camera, the ends of this recess being preferably closed by the sides of the camera.

Telescoping rod supports are slidably mounted in the passages 37, each comprising a tubular portion 39, a reduced tubular extension portion 40 movable within the tubular portion 39, and a reduced extension post 41 movable within the portion 40, and which are adapted to lie within the passages in the inoperative or closed position of the device (Figs. 8 to 10), and to be extended forwardly therefrom in the operative or open position (Fig. 7).

The extension of the telescoping portions 40 and 41 is limited by suitable stops as slots 42 in the portions 39 and 40 and pins 43 in the portions 40 and 41 slidably engaging said slots, while the extension of the tubular portions 39 is limited with respect to the passages 37 by stop shoulders 44 upon the inner ends of said portions 39 adapted to abut shoulders 45 provided at the forward ends of the passages.

A transverse title holder bar 46 is mounted upon the ends of the extension portions 41 and is provided with a slot 47 into which a card 48, bearing the title to be photographed, is placed in the extended position of the device. In the closed position the bar 45 is disposed within the recess 38 in flush relation with the outer surface of the camera, its forward and bottom surfaces being preferably finished, as by a covering 49, so that it conforms to the finish and contour of the camera.

In Fig. 11 I have shown a modification in which the title-holder parts, as shown in Figs. 7 to 10 are provided in a separate member 50, of rectangular form, adapted to be secured to the bottom of the camera, as by screws 51.

I have illustrated and described a preferred and satisfactory embodiment of the invention, but it will be obvious that changes may be made therein within the spirit and scope thereof as defined in the appended claims.

Having thus described my invention what I claim and desire to secure by Letters Patent is:—

1. In combination with a camera, a title holder panel adapted to overlie a side of said camera, in flush relation with the exposed surface of said camera, and a support for said panel hinged at one end in parallel relation to and adjacent an edge of said camera, and hinged at its other end in parallel relation to and adjacent an edge of said panel, said support adapted to be swung to position said panel in line with the camera lens.

2. In combination with a camera, a title holder, and an extensible support for said holder connected to the camera and the holder, the connection with said holder arranged to be moved with respect to the connection with said camera to position said holder in an inoperative position contiguous to the camera and in an operative position forwardly of the camera lens, said support in its inoperative position being disposed between said holder and a portion of the camera opposed to said holder, and enclosing means disposed between said holder and said opposed portion of the camera and cooperating therewith to provide a pocket to receive and completely conceal said support in its inoperative position.

3. In combination with a camera, a title holder panel arranged to overlie a portion of said camera in spaced and parallel relation thereto, means extending about the sides of said panel constituting a composite continuous part of the exposed surface of said camera and providing a pocket between said panel and said camera, and a support for said panel movably connected to said camera and arranged to be moved relatively to said camera to position said panel forwardly of the camera lens in the operative position and to be disposed and completely concealed in said pocket in the inoperative position.

4. In combination with a camera, a rectangular title holder adapted to overlie a portion of said camera and including a flange extending about its four sides in flush relation to said camera, the space between said title holder and said camera constituting a concealed pocket, and an extensible support for said holder connected at one end of said camera and at its other end to said holder arranged to position said holder in said flush relation to the camera and to be disposed and completely concealed within said pocket in its inoperative position, whereby the exposed surfaces of said holder constitutes a composite part of the surface of the camera, and in its extended position to position said holder forwardly of the camera lens.

5. In combination with a camera, having a pocket at its forward side, a title holder adapted to engage said pocket in flush relation with the exposed surface of said camera, an extensible support for said holder connected at one end to the camera and at its other end to said holder, said support adapted in the retracted inoperative position to position said holder in engaging relation with said pocket and adapted in its extended operative position to position said holder forwardly of the camera lens.

Signed at Pawtucket, in the county of Providence, and State of Rhode Island, this 26 day of February, 1930.

JOHN W. LITTLE.